US009443395B2

(12) United States Patent
Berman et al.

(10) Patent No.: US 9,443,395 B2
(45) **Date of Patent: *Sep. 13, 2016**

(54) SYSTEM AND METHOD FOR PRESENTING PAYOUTS IN GAMING SYSTEMS

(71) Applicant: KING SHOW GAMES, INC., Minnetonka, MN (US)

(72) Inventors: Bradley Berman, Minnetonka, MN (US); Adam Martin, St. Louis Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,873

(22) Filed: Apr. 8, 2015

(65) Prior Publication Data

US 2015/0213685 A1 Jul. 30, 2015

Related U.S. Application Data

(63) Continuation of application No. 14/132,543, filed on Dec. 18, 2013, now Pat. No. 9,011,230, which is a continuation of application No. 13/647,283, filed on Oct. 8, 2012, now Pat. No. 8,636,576, which is a continuation of application No. 10/983,106, filed on Nov. 5, 2004, now Pat. No. 8,282,461.

(60) Provisional application No. 60/517,927, filed on Nov. 6, 2003.

(51) Int. Cl.
*A63F 13/00* (2014.01)
*G07F 17/32* (2006.01)

(52) U.S. Cl.
CPC ........... *G07F 17/3286* (2013.01); *G07F 17/32* (2013.01)

(58) Field of Classification Search
USPC ...................................................... 463/16, 20
See application file for complete search history.

(56) References Cited

U.S. PATENT DOCUMENTS

| | | | |
|---|---|---|---|
| 5,096,196 | A | 3/1992 | Gutknecht et al. |
| 5,462,277 | A | 10/1995 | Takemoto |
| 5,839,955 | A | 11/1998 | Mangano et al. |
| 5,848,932 | A | 12/1998 | Adams |
| 5,882,261 | A | 3/1999 | Adams |
| 6,059,658 | A | 5/2000 | Mangano et al. |
| 6,089,978 | A | 7/2000 | Adams |
| 6,105,962 | A | 8/2000 | Malavazos et al. |
| 6,224,483 | B1 | 5/2001 | Mayeroff |
| 6,398,220 | B1 | 6/2002 | Inoue |
| 6,413,162 | B1 | 7/2002 | Baerlocher et al. |

(Continued)

OTHER PUBLICATIONS

King Show Games, Inc., “Listing of Related Cases”, Apr. 8, 2015, 1 page.

*Primary Examiner* — Masud Ahmed

(57) ABSTRACT

A system, apparatus and method for presenting payouts in primary and/or secondary gaming activities. A plurality of wheels, rings, or other shapes are provided, where each includes a plurality of different symbols, numbers, or other indicia that can be used as a part of a collective payout award. The wheels, rings, or shapes are rotated, and at least one segment designator is provided to demarcate segments of each wheel, ring, or shape as an active segment when the wheels, rings, or shapes stop spinning. The payout amount is based on the aggregate of the symbols, numbers, and/or other indicia presented via the segment designator(s) when the spinning wheels, rings, or shapes have come to rest. In an alternate embodiment, the segment designators are rotated, and demarcate segments of each wheel, ring, or shape as an active segment when the segment designators stop spinning.

20 Claims, 7 Drawing Sheets

(56) References Cited

U.S. PATENT DOCUMENTS

| | | | |
|---|---|---|---|
| 6,558,253 | B1 | 5/2003 | DeSimone et al. |
| 6,561,512 | B2 | 5/2003 | Luciano et al. |
| 6,598,877 | B1 | 7/2003 | Luciano et al. |
| 6,705,944 | B2 | 3/2004 | Luciano |
| 6,899,625 | B2 | 5/2005 | Luciano et al. |
| 6,905,407 | B2 | 6/2005 | Nordman |
| 2001/0022429 | A1 | 9/2001 | Luciano et al. |
| 2001/0034260 | A1 | 10/2001 | Luciano et al. |
| 2002/0155882 | A1 | 10/2002 | Baerlocher et al. |
| 2003/0027628 | A1 | 2/2003 | Luciano |
| 2003/0178768 | A1 | 9/2003 | Luciano et al. |
| 2004/0082378 | A1 | 4/2004 | Peterson et al. |

SYSTEM AND METHOD FOR PRESENTING PAYOUTS IN GAMING SYSTEMS

RELATED APPLICATIONS

This application is a continuation of U.S. patent application Ser. No. 14/132,543 filed on Dec. 18, 2013, now U.S. Pat. No. 9,011,230, issued on Apr. 21, 2015, which is a continuation of U.S. patent application Ser. No. 13/647,283, filed on Oct. 8, 2012, now U.S. Pat. No. 8,636,576, issued Jan. 28, 2014, which is a continuation of U.S. patent application Ser. No. 10/983,106, filed on Nov. 5, 2004, now U.S. Pat. No. 8,282,461, issued Oct. 9, 2012, which claims the benefit of U.S. Provisional Application No. 60/517,927, filed on Nov. 6, 2003, to which priority is claimed pursuant to 35 U.S.C. §119(e), all of which are hereby incorporated herein by reference in their entirety.

FIELD OF THE INVENTION

This invention relates in general to gaming, and more particularly to a system and method for presenting payouts in gaming systems.

BACKGROUND OF THE INVENTION

Pure chance gaming devices such as slot machines have proved wildly popular, and in recent years have rivaled and even surpassed their once untouchable table game counterparts. One reason for this popularity is the increase in innovation, and the recognition of the need for human stimulation. While true that a primary motivator for people to play gaming devices is the chance to win monetary or other prizes (in the case of legalized gambling), the intrigue and excitement of playing these newly created machines lures people as well. It is therefore desirable to provide captivating gaming opportunities for game player, to maintain player interest.

The gaming industry is continually seeking ways to attract and captivate casino participants. One such manner of stimulating interest and heightening excitement has been through the use of "bonus" events. Bonus events or games are used to attract and keep players at a gaming machine. A bonus game is typically an additional gaming reel or machine, or a random selection device, that is enabled by a bonus qualifying signal from an underlying or primary gaming machine. Generally, a predetermined prize-winning combination of symbols in an underlying or primary game may result in the player being awarded bonus activity. Often the bonus event has a much higher probability of winning, thereby instilling a great interest by players in being awarded bonus events.

Conventionally, participation in slot machines involves initiating the rotation of multiple reels, and allowing the machine to randomly stop the reel rotation such that associated reel symbols line up a payline. If the symbols on that payline correspond to a predetermined symbol combination, the participant wins an amount corresponding to the particular symbol combination. For multi-lined paylines, a coin or other token may be played for any one or more of the available paylines, and each of the paylines may provide a winning payout. When this occurs, the slot machine pays out according to the payoff table posted on the slot machine. The payoff table informs players of the winning symbol combinations for that machine, and what each combination pays based on the number of coins allocated for the spin. If a winning combination occurs, the machine releases money or tokens into a payout chute, or may award the winning amount onto a credit meter for the player. For example, if a player initially wagered three coins and that player won a high payout, that player may receive fifty coins of the same denomination in return, or may receive fifty credits for continued play.

In furtherance of the need to attract casino patrons, there is a continuing need to further the excitement and visual stimulation in the participation of gaming activities. The present invention fulfills these and other needs, and offers advantages over prior art gaming approaches.

BRIEF DESCRIPTION OF THE DRAWINGS

The invention is described in connection with the embodiments illustrated in the following diagrams.

SUMMARY OF THE INVENTION

Figure 1:
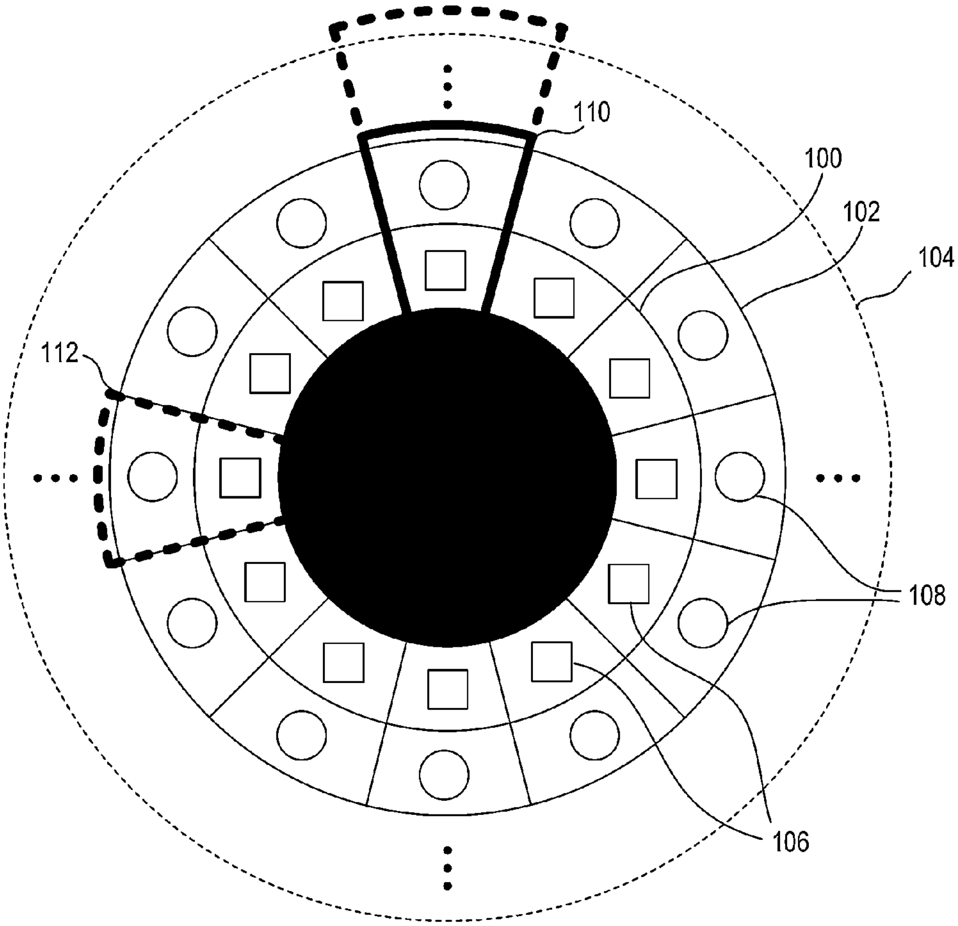
FIG. 1 is a block diagram illustrating one embodiment of a multi-wheel gaming activity in accordance with the present invention.

To overcome limitations in the prior art described above, and to overcome other limitations that will become apparent upon reading and understanding the present specification, the present invention discloses a system, apparatus, and method for providing a gaming activity having a plurality of concentric wheels, rings, or other shapes, where each includes a plurality of different symbols, numbers, or other indicia that can be used as a part of a collective payout award.

Generally, the present invention is directed to methods and apparatuses for facilitating participation in a slot game, such as that played on a slot machine or other computing device. An embodiment of a gaming method in accordance with the present invention involves providing a plurality of concentric wheels, rings, or other shapes, where each includes a plurality of different symbols, numbers, or other indicia that can be used as a part of a collective payout award. The wheels, rings, or shapes are rotated, and at least one segment designator is provided to demarcate segments of each wheel, ring, or shape as an active segment when the wheels, rings, or shapes stop spinning. The payout amount is based on the aggregate of the symbols, numbers, and/or other indicia presented via the segment designator(s) when the spinning wheels, rings, or shapes have come to rest. In an alternate embodiment, the segment designators are rotated, and segments of each wheel, ring, or shape are demarcated as an active segment when the segment designators stop spinning.

An embodiment of a method for presenting gaming payouts in accordance with the present invention involves rotating a plurality of concentric wheels, wherein each of the concentric wheels includes indicia representative of a portion of a collective payout result. The rotation is stopped, demarcating at least one segment on each of the plurality of concentric wheels as part of the collective payout result. The collective payout result is determined based on an aggregation of the demarcated segments. Stopping the rotation of the plurality of concentric wheels may involve stopping all the concentric wheels simultaneously, or stopping one or more of the concentric wheels individually, either automatically, or in response to a player input.

Embodiments involve rotating the plurality of concentric wheels in an opposite direction to any adjacent wheel, such as by rotating a first wheel of the plurality of concentric wheels in an opposite direction to an adjacent wheel of the plurality of concentric wheels. Methods for presenting gaming payouts in accordance with the present invention may be provided as a primary gaming activity, and/or as a bonus activity resulting from occurrence of a predetermined event in a primary gaming activity. The collective payout result may involve using a demarcated indicia from each of the concentric wheels in succession to construct a multi-digit numeral.

Further embodiments of gaming methods in accordance with the present invention involve providing a plurality of concentric indicia representative of a payout result and rotating a plurality of demarcating elements, where each demarcating element demarcates at least a portion of one or more of the plurality of concentric indicia. The rotation of the plurality of demarcating elements is stopped, and the payout result is determined based on the demarcated portions of the plurality of concentric indicia.

In more particular embodiments, demarcating at least one segment involves framing an area comprising substantially aligned segments on each of the concentric shapes as part of the collective payout result. In another embodiment, demarcating a segment(s) involves using a single demarcation element to frame a plurality of substantially aligned segments on each of the concentric shapes as part of the collective payout result. Alternatively, demarcating a segment(s) involves using a plurality of demarcation elements to frame the segments on each of the concentric shapes as part of the collective payout result.

Other particular embodiments involve allowing the gaming activity to repeat until a predetermined event occurs. Such a predetermined event may be include a predetermined number of collective rotations (e.g., three spins of the wheels/shapes), occurrence of a termination symbol in the demarcated segment(s), occurrence of a termination symbol in the demarcated segment(s) a predetermined number of times (e.g., three strike symbols), or the like.

In other embodiments, the indicia includes different symbol types, where a first type may be star symbols, a second type includes cherry symbols, etc. In such an embodiment, determining the collective payout result based on an aggregation of the indicia presented via the demarcated segments may involve determining the collective payout result based on an aggregation of a common symbol type presented via the demarcated segments. In one embodiment this is determined by comparing the aggregation of the common symbol type with a pay table. For example, if the pay table indicates that three cherry symbols receives a payout of $20, and three cherry symbols are presented in the demarcated segment(s), then the player is awarded $20. In still other particular embodiments, the indicia may include (at least) numeric values and multiplier values, where determining the collective payout result involves multiplying a numeric value presented in the demarcated segments by a multiplier presented in the demarcated segments. In other embodiments the indicia may include numeric values, and determining the collective payout result involves forming a multi-digit numeral from the numeric values associated with the demarcated segments. Other functions may be used, such as addition, subtraction, multiplication, etc. For example, where the indicia includes numeric values, determining the collective payout result may involve adding the numeric values associated with the demarcated segments to arrive at the collective payout result.

Other embodiments of gaming methods in accordance with the present invention involve providing a plurality of concentric indicia representative of a payout result, and providing a plurality of demarcating elements, each demarcating element demarcating at least a portion of one or more of the plurality of concentric indicia. One or both of the plurality of concentric indicia and the plurality of demarcating elements are rotated, and cessation of the rotation determines the payout result based on the demarcated portions of the plurality of concentric indicia.

Other embodiments in accordance with the present invention are directed to an apparatus for presenting gaming payouts, including a plurality of rotatable concentric shapes, such as wheels, wherein each of the concentric wheels includes indicia representative of a portion of a collective payout result. At least one segment designator is positioned proximate the plurality of concentric wheels to identify the indicia associated with the collective payout result when the plurality of concentric wheels cease rotation. A processor is configured to control cessation of rotation of the concentric wheels, to position the indicia associated with the collective payout result at the segment designator.

Further embodiments of devices in accordance with the present invention are directed to an apparatus including a plurality of rotatable shapes that are rotatable about a common axis through the center of the face of each of the plurality of rotatable shapes, wherein each of the rotatable shapes includes indicia representative of a portion of a collective payout result. At least one segment designator is positionable proximate the plurality of concentric wheels to identify the indicia associated with the collective payout result when the plurality of rotatable shapes cease rotation. A processor is configured to control cessation of rotation of the rotatable shapes to position the indicia associated with the collective payout result at the at least one segment designator. The plurality of rotatable shapes may be stacked, and/or one or more of the plurality of rotatable shapes may be positioned within an inner diameter of other ones of the plurality of rotatable shapes.

The processor may include a random number generator configured to randomly select the symbols for presentation in the active grid positions. A casino gaming apparatus in accordance with the present invention may be configured as a slot machine, and the standard mode of operation of the slot machine is a slot game. Other embodiments include poker games, bingo games, keno games, or other games.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

DETAILED DESCRIPTION OF THE INVENTION

This document may contain material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner for presenting payouts in gaming activities. The invention may be used in connection with primary gaming activity and/or in connection with secondary/bonus activity. A plurality of concentric wheels, rings or other rotatable shapes are provided, where each of the concentric wheels/shapes includes a plurality of different symbols, numbers, or other indicia that can be used as a part of a payout award. At least one, and typically all, of the wheels/shapes are rotated to initiate this aspect of the gaming activity. At least one demarcating element is provided to act as a segment designator, and demarcate segments of each wheel/shape as an active segment when the wheels/shapes stop spinning. The payout amount is based on the aggregate of the symbols, numbers, and/or other indicia presented via the demarcating element (s) when the spinning wheels/shapes have come to rest.

In one embodiment, the indicia provided on the wheels/shapes include numeric values. When the wheels/shapes stop spinning, a plurality of numeric values may be presented as the demarcated segment(s) via the demarcating element(s). In one embodiment, the resulting payout award is determined by using the individual numeric values to create or "build" a multi-digit number. For example, if a demarcating element identifies three individual numerals on three rotating wheels/shapes such as "0" "2" "5" (i.e., "0" on a first wheel/shape, "2" on a second wheel/shape, etc.), then the resulting multi-digit number is "025" which indicates the payout award. For example, "025" may represent 025 (i.e., twenty-five) credits, where the actual payout award is then determined by the monetary value associated with each credit. A number of various embodiments of the invention are described in greater detail below.

It should be noted that although many of the embodiments described herein apply to circular wheels, the description is equally applicable to non-circular wheels, as described more fully below.

FIG. 1 is a block diagram illustrating one embodiment of a multi-wheel gaming activity in accordance with the present invention. As indicated above, the gaming activity may occur in connection with a primary gaming activity or in connection with secondary or "bonus" activity. The invention may be implemented electronically via video presentations, or via a mechanical presentation using physical wheels. In accordance with one embodiment of the invention, the gaming activity includes a plurality of concentric rings or wheels 100, 102, 104, which spin independently of one another. Any number of wheels may be used, depending on the particular application/game being played. Each wheel 100, 102, 104 includes a plurality of indicia, each of which represents a portion or subset of a collective payout result. For example, wheel 100 includes a plurality of symbols 106, wherein at least some of the symbols 106 differ from one another. Similarly wheel 102 includes a plurality of symbols 108, wherein at least some of the symbols 108 differ from one another. In some cases, there may be no symbol/indicia in a particular location; i.e., a null or blank space that has no impact on the resulting payout.

The wheels 100, 102, 104 may all spin in the same direction, or any one or more of the wheels may spin in an opposite direction of other wheels. In one embodiment, a first wheel spins clockwise, a second wheel spins counter-clockwise, and so forth. At least one designator 110 is provided to demarcate certain indicia on each of the wheels 100, 102, 104 that represent the indicia relevant to the payout result. This demarcation is set when the wheels stop spinning. In some embodiments, additional designators 112 may be provided, and the payout result is based on at least one or all of the designators 110, 112. For example, two designators 110, 112 may be provided, and the user may select a desired one of the designators, or alternatively a designator may be selected randomly in connection with play of the game. In another embodiment, multiple designators 110, 112 may be used aggregately to determine the payout result. For example, the total payout result may be the sum, product, difference, or other predetermined function of the results of multiple designators 110, 112. In a further embodiment, the wheels 100, 102, 104, remain stationary and the designators 110, 112 spin and stop at a location on the wheels 100, 102, 104 to demarcate the indicia. For example, two designators, such as the designators 110, 112, may revolve around stationary wheels 102, 104. The designators 110, 112 may then simultaneously, or individually, stop. Stopping the designators may occur automatically (e.g., after a predetermined spin time), in response to a game player's input, individually or simultaneously. In one embodiment, each of the demarcating elements 110, 112 are rotated in an opposite direction to any adjacent demarcating element 110, 112. In another embodiment, a demarcating element is rotated in an opposite direction to an adjacent demarcating element. In further embodiments, one or more wheels 102, 104 and one or more designators 110, 112 may spin in any combination.

Figure 2:
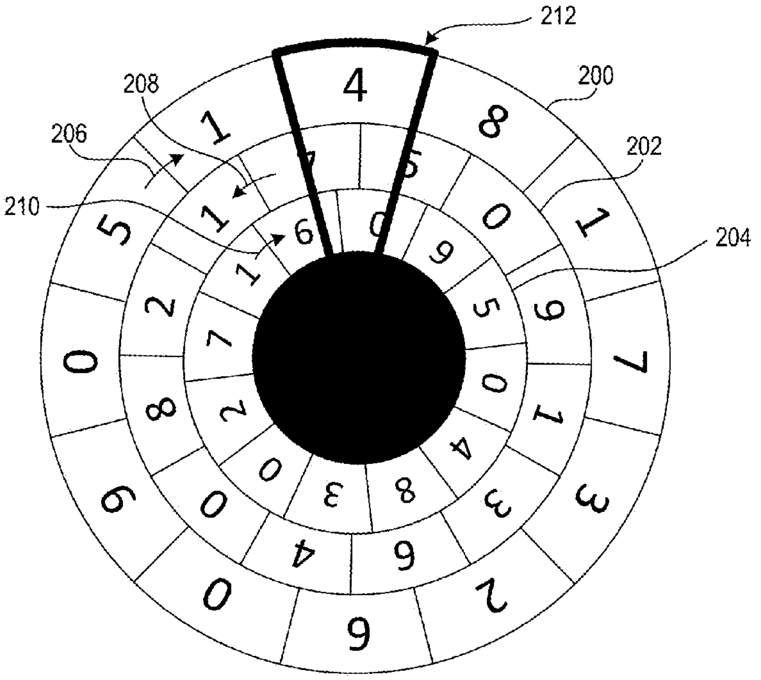
FIG. 2 illustrates an embodiment where the indicia on the concentric wheels are represented by numbers that are each capable of forming a portion of a collective payout result.

As will be described in more detail below, the indicia 106, 108 on each of the wheels 100, 102, 104 may include numbers and/or symbols that, when presented in the aggregate using a designator(s) 110, create a resulting payout. For example, FIG. 2 illustrates an embodiment where numbers represent the indicia on the wheels. The embodiment of FIG. 2 includes three wheels 200, 202, 204, and each wheel includes twelve segments, each segment including a number. In example embodiments, the segments are equally spaced relative to other segments on its respective wheel.

In the illustrated embodiment, wheel 200 spins clockwise, wheel 202 spins counter-clockwise, and wheel 204 spins clockwise as indicated by arrows 206, 208, 210 respectively. In a video embodiment, a software-based computing system may cause the wheels 200, 202, 204 to have the appearance of spinning in the appropriate directions, while mechanical versions physically spin. The wheels will then either slowly stop spinning, or may even abruptly stop spinning in some embodiments such as a video embodiment. In a mechanical embodiment, the wheels slow down and ultimately stop rotating.

When the wheels stop spinning, a number from each of the wheels 200, 202, 204 will be visible by way of the result designator 212. In one embodiment, the result designator 212 includes a highlighting or other delineation mechanism to set certain indicia on each wheel apart from the remaining indicia. In the illustrated embodiment, the designator 212 delineates numbers that are physically aligned, although this need not be the case. For example, a designator 212 may be used on each of the wheels at different locations such that the resulting payout is not physically aligned. However, in the embodiment illustrated in FIG. 2, the result is delineated in a physical alignment.

In the embodiment of FIG. 2, the numbers that are visible within the designator 212 aggregately represent the resulting payout. Each number on each wheel represents one portion of the aggregate result. In one embodiment, wheel 200 may represent the hundreds place, wheel 202 may represent the tens place, and wheel 204 may represent the ones place in a resulting payout. For example, a "1" presented in the designator 212 area on wheel 200, together with a "0" presented in the designator 212 area on wheels 202 and 204 would result in a "100" or 100 credits. Where each credit corresponds to $1, for example, the player would be awarded $100. Either the inner wheel 204 or the outer wheel 200 may represent the most significant value (e.g., hundreds place) in the resulting number, with the remaining wheels being of decreasing significance.

Figure 3A:
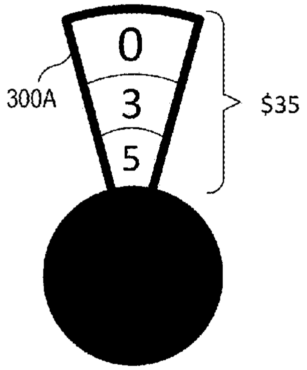
FIGS. 3A, 3B, 3C illustrate various representative embodiments in which the payout result may be determined.
Figure 3B:
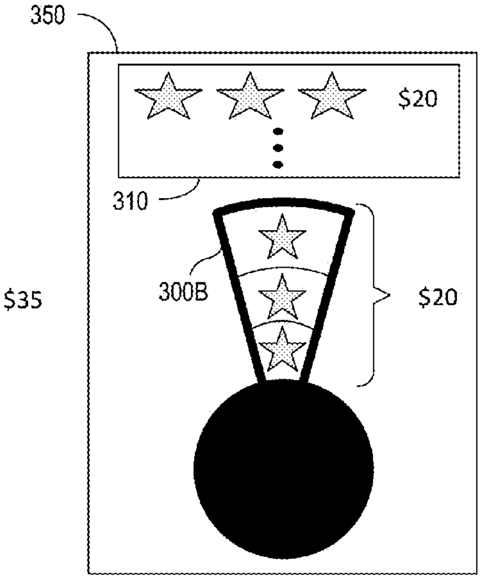
Figure 3C:
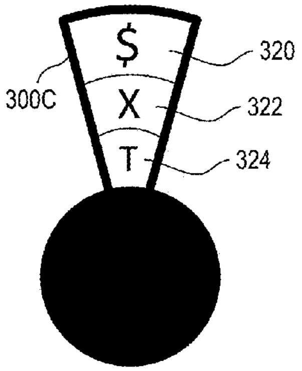

FIGS. 3A, 3B, 3C illustrate various representative embodiments in which the payout result may be determined. FIG. 3A illustrates an example similar to that described in connection with FIG. 2, where three values in the designator area 300A align to create or "build" the resulting payout amount. In this embodiment with the most significant value being on the top, the result presented in the designator area 300A is "035" or $35 (or alternatively 35 quarters, 35 tokens, 35 credits or other units).

In another embodiment, wheels having numeric values may provide a sum rather than creating a number. For example, a "035" may provide $35 where each number represents a digit in a resulting payout amount, but may provide $8 where each number represents an addend to provide a sum.

FIG. 3B illustrates another embodiment, where symbols are presented rather than numeric values. In this embodiment, the payout result is based on the player receiving a certain symbol or certain pattern of symbols. In the illustrated embodiment, a gaming system presentation 350 includes a pay table 310 showing that receipt of three star symbols results in a $20 award. The designator area 300B delineates certain symbols when the wheels stop spinning, and in the illustrated embodiment the result is three star symbols. As indicated in the pay table 310, this results in a payout amount of $20.

FIG. 3C illustrates another embodiment, where the resulting payout is again based on the aggregate of the indicia on each of the wheels that is presented in the result designator area 300C. However, one or more of the wheels may provide a different payout type. In the illustrated embodiment, a first wheel 320 provides a dollar ($) amount, a second wheel 322 provides a multiplier (X) value, and a third wheel 324 provides a termination (T) indicator. For example, the dollar ($) amount may be "20," the multiplier (X) may be "5," and the termination (T) indicator may indicate that further wheel spins are awarded. In this case, the player would win $20 times 5, or $100, and would be awarded another spin of the wheels. If the termination (T) indicator indicated that no further spins are awarded, the player is still awarded the $100 in one embodiment, while in another embodiment the player may not be awarded the $100 unless the T indicator is favorable.

Figure 4A:
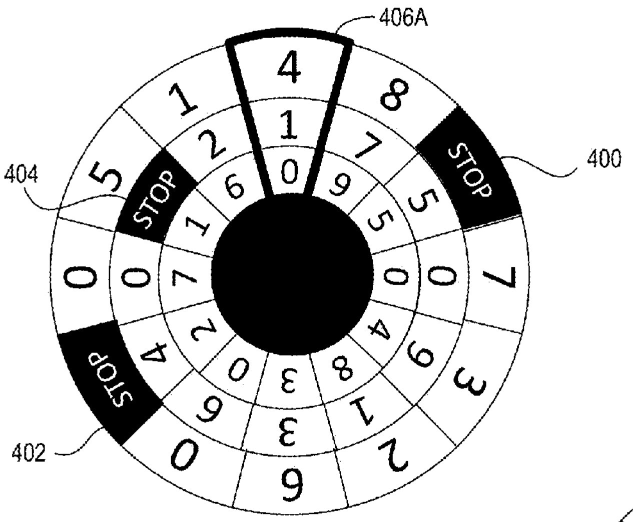
FIGS. 4A, 4B, and 4C illustrate additional representative embodiments in which the invention may be implemented.
Figure 4B:
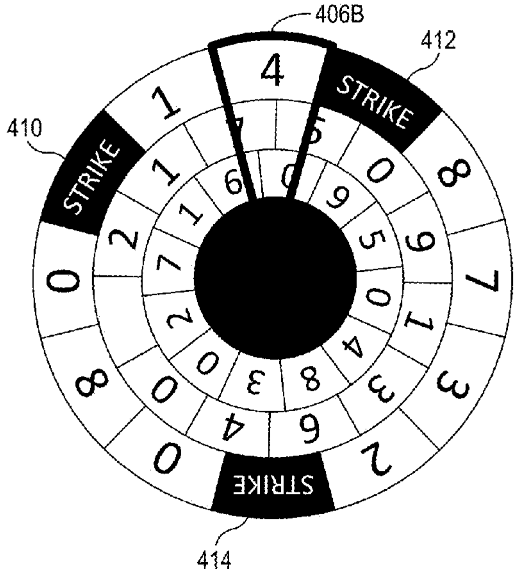
Figure 4C:
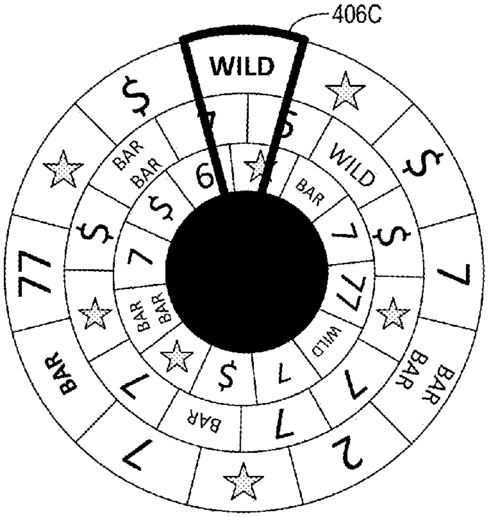

FIGS. 4A, 4B, and 4C illustrate additional representative embodiments in which the invention may be implemented. FIG. 4A is similar to the embodiment of FIG. 2, with the exception that termination (STOP) segments 400, 402, 404 are provided. In one embodiment, if any of the STOP segments 400, 402, 404 comes to rest within the designator area 406A (or alternatively within a second provided designator area), no further spins to accumulate the payout result will be allowed. Such an embodiment of the invention allows for continued spins of the wheels until such a STOP segment 400, 402, 404 comes to rest in the designator area 406A. In another embodiment, termination of the accumulated payout result may occur only if a predetermined number of such termination indicia are presented in the designator area 406A, such as all three segments 400, 402, 404 being presented in the designator area 406A. Such an embodiment may be more practical where a larger number of termination segments are provided on the wheels.

It should also be noted that any numeric values in the designator area 406A may, or may not, be provided to the player when one or more termination symbols are also presented in the designator area 406A. For example, if the resulting pattern is "4, STOP,0" the player may receive nothing. In another embodiment, the STOP symbol may have a predetermined value (e.g., 1, 9, etc.), such that the player still wins an amount.

FIG. 4B is similar to the embodiment of FIG. 4A, but implements a "three strikes you're out" theme. The gaming activity will allow repeated spins and awards until the player receives three (or any predetermined number) STRIKES 410, 412, 414 in the designator area 406B. The STRIKES may be on any of the wheels, and any number of such STRIKES may be provided. For example, only one wheel may include only one STRIKE, in which case it would be expected that continued play would occur much longer than where multiple STRIKE segments 410, 412, 414 are provided. In other embodiments, at least one STRIKE segment is provided on each of the wheels, such that three STRIKES must be present in the designator area 406B to cause play to be terminated.

FIG. 4C implements symbols instead of, or in addition to, numeric values. In the illustrated embodiment of FIG. 4C, symbols are provided on each of the wheels, and the aggregation of symbols in the designator area 406C represents the winning payout. The resulting symbol combination can be compared to a pay table to determine if, and how much, the resulting symbol combination provides. A similar embodiment was described in connection with FIG. 3B. As is illustrated in FIG. 4C, wild symbols may be provided that may be interpreted as any symbol that is beneficial to the game player.

Figure 5:
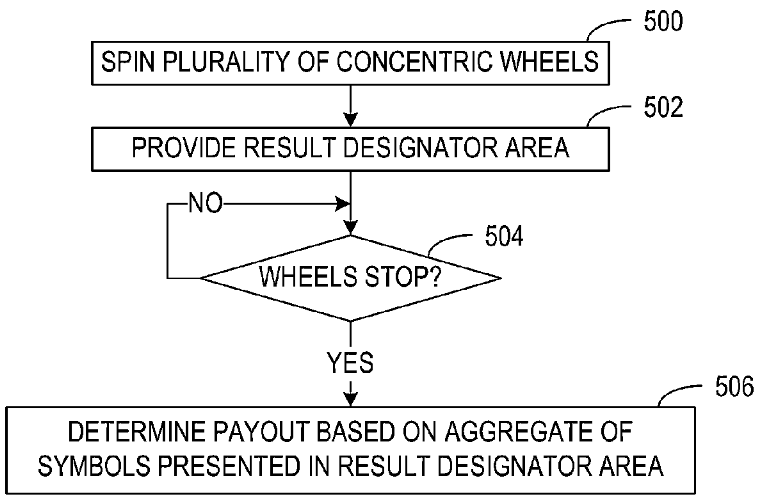
FIG. 5 is a flow diagram illustrating one embodiment of a method for presenting payouts in connection with a gaming activity according to the present invention.

FIG. 5 is a flow diagram illustrating one embodiment of a method for presenting payouts in connection with a gaming activity according to the present invention. In this embodiment, a plurality of concentric wheels are spun 500, and a result designator area(s) is provided 502. When the wheels come to rest as determined at decision block 504, the payout is determined 506 based on an aggregation of the symbols (i.e., numbers, images, etc.) presented in the result designator area.

Figure 6:
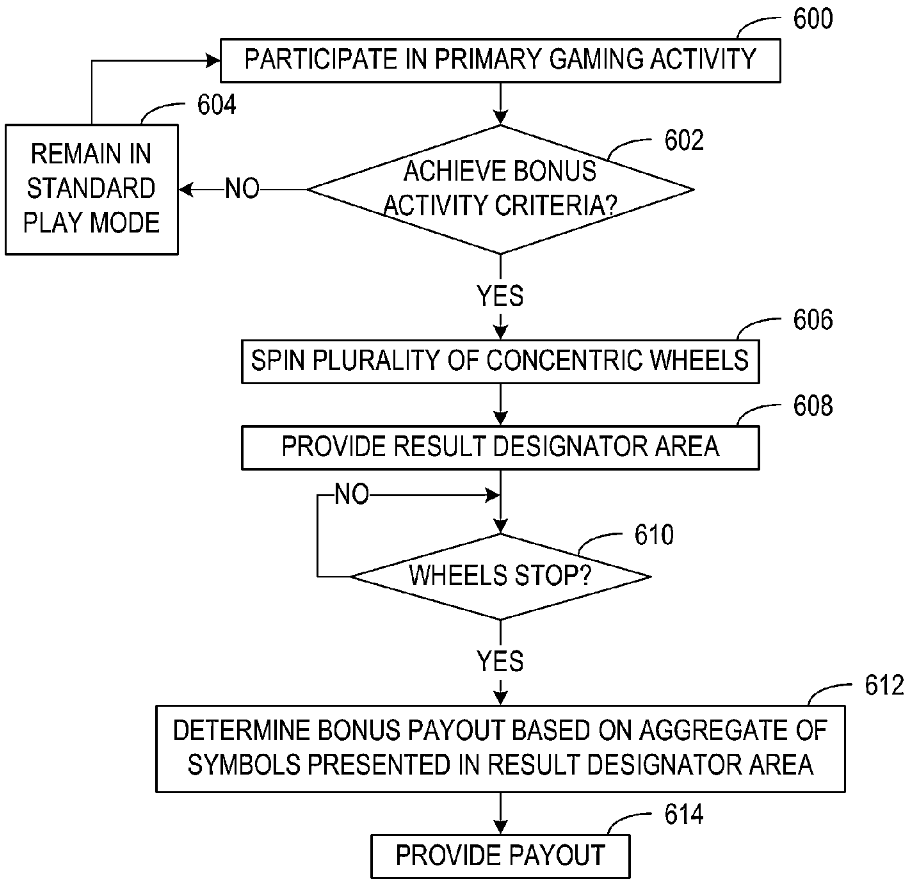
FIG. 6 is a flow diagram illustrating an embodiment of a method for presenting payouts in connection with a bonus activity according to the present invention.

FIG. 6 is a flow diagram illustrating an embodiment of a method for presenting payouts in connection with a bonus activity according to the present invention. The system allows a player to participate 600 in a primary gaming activity, which may include any desired gaming activity such as slot games, poker games, or other conventional games played on slot machine-style games. For example, the system may be a mechanical or video slot machine having a plurality of reels, and having one or more paylines. When any of one or more predetermined symbol combinations occurs via the primary gaming activity, the player will be allowed to enter a secondary or "bonus" activity. In the illustrated embodiment, if the player does not achieve the bonus activity criteria as determined at decision block 602, the player remains 604 in the standard play mode. Otherwise, the player enters the bonus round, where the plurality of concentric wheels is spun 606. A result designator area is provided 608, and when the wheels stop spinning as determined at decision block 610, the bonus payout is determined 612 based on the aggregate of the indicia presented in the result designator area. This aggregation of the symbols in the result designator area enables a payout to be determined and provided 614 to the player.

Figure 7:
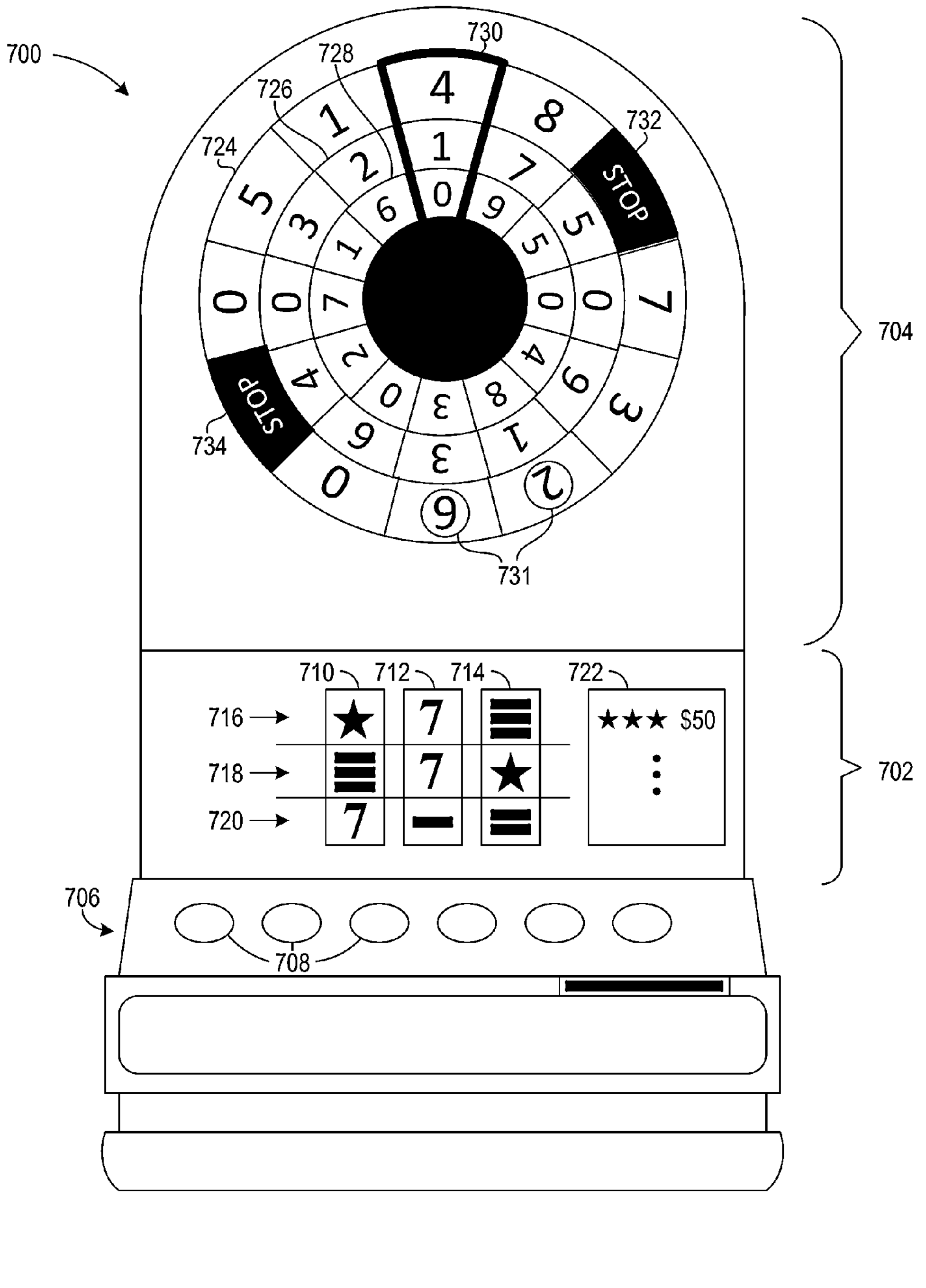
FIG. 7 is an embodiment of a casino-style gaming device in which the principles of the present invention may be applied as a bonus activity.

FIG. 7 is an embodiment of a casino-style gaming device in which the principles of the present invention may be applied as a bonus activity. Many traditional casino table games may be provided in a "video game" available via a casino-style gaming device shown in FIG. 7. For purposes of explanation, the description of the gaming device in FIG. 7 is provided in terms of a slot machine 700. However, the present invention is analogously applicable to other casino-style games (video poker, video bingo, etc.) having the ability to include at least one bonus activity. The present invention is also applicable as a bonus event for table games such as poker or other gaming activities.

The slot machine 700 is a structure including at least a primary gaming activity presentation 702 and a bonus activity presentation 704. The slot machine 700 includes a housing for embodiments having a self-supported, independent structure. A user interface 706 is provided to allow the user to control and engage in play of the slot machine 700. The particular user interface mechanisms associated with user interface 706 is dependent on the type of gaming machine. For example, the user interface 706 may include one or more buttons, switches, joysticks, levers, pull-down handles, trackballs, voice-activated input, or any other user input system or mechanism that allows the user to play the particular gaming activity. The user input 706 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 706 that the user can initiate the standard mode of play, and in some embodiments may optionally control certain aspects of the bonus mode of play. In the case of a slot machine, the user input may include a plurality of buttons, e.g., button 708, which allow the user to, for example, enter a number of credits to play, identify the number of paylines in which to participate, start and/or stop one or more wheels from spinning, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, pulling a handle/lever, or other known user entry methodology. The particular user interface mechanism employed is not relevant to the present invention.

The primary gaming activity presentation 702 may be provided via a video display device or via mechanical reels. In the case of a video display device, the display device may take on a variety of forms depending on what type of presentation is to be provided. For example, a standard slot gaming activity includes multiple reels 710, 712, 714, and in the illustrated embodiment three paylines 716, 718, 720 are provided. Any number of paylines and/or reels may be provided where the primary gaming activity is a slot game.

Also associated with the gaming device 700 may be a pay table 722, where information associated with the potential winning symbol combinations of the standard slot game activity may be presented. This area may also provide an indication of the requisite symbols, symbol combinations, symbol locations, or other indications that are required to invoke the bonus mode in accordance with the invention. This information may be part of a display screen, or alternatively may be separate from the display screen and provided directly on a portion of the structure itself. For example, a backlit colored panel may be used as the winning guide area.

When the player achieves the requisite bonus qualifying criteria via the primary gaming activity, the player will be allowed to participate in the bonus activity in accordance with the present invention. The bonus activity illustrated in FIG. 7 is a concentric wheel bonus as previously described, having three concentric wheels 724, 726, 728, and a result designator 730. In the illustrated embodiment, each of the wheels 724, 726, 728 includes numeric values (e.g., 731) as well as one or more termination (STOP) segments 732, 734. The particular bonus activity presentation 704 is provided for purposes of illustration only, as any such bonus activity presentation according to the invention may be provided.

Figure 8:
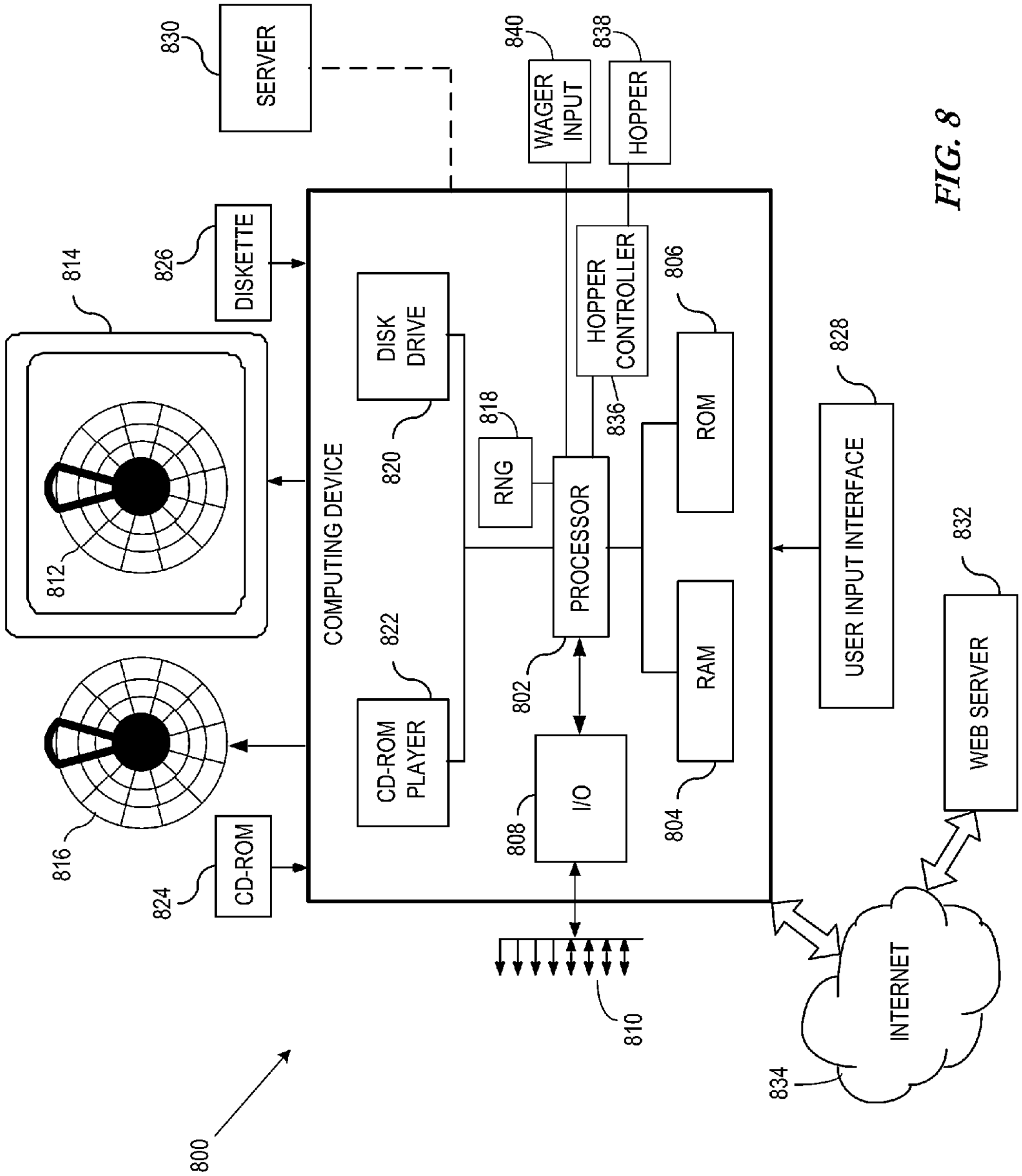
FIG. 8 illustrates an example of a representative computing system capable of carrying out operations in accordance with the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 8.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 800 of FIG. 8 is an example computing structure that can be used in connection with the primary gaming activity and/or bonus gaming activity for such electronic gaming machines.

The example computing arrangement 800 suitable for performing the concentric wheel primary and/or bonus activity in accordance with the present invention typically includes a central processing unit (CPU) or other processor 802 coupled to random access memory (RAM) 804 and some variation of read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals, communication signals, and the like.

Chance-based gaming systems such as slot machines, in which the present invention is applicable, are governed by random numbers and processors. Control of electronic wheels 812 on a display 814, and/or control of mechanical wheels 816 in accordance with the invention are provided in part by a random number generator (RNG). RNGs are well-known in the art, and may be implemented using hardware, software operable in connection with the processor 802, or some combination of hardware and software. In accordance with generally known technology in the field of slot machines, the processor 802 associated with the slot machine, under appropriate program instruction, can simulate the rotation of the plurality of wheels. The present invention is operable using any known RNG, and may be integrally programmed as part of the processor 802 operation, or alternatively may be a separate RNG controller 818. RNGs are well known in the art, and any type of RNG may be implemented for the standard mode of play and/or the bonus mode of play in accordance with the invention. Further, all or part of the processing and/or RNG function may be provided locally or all or part may be provided remotely, such as having the random value/event downloaded from a networked system in a central determination configuration.

The computing arrangement 800 may also include one or more data storage devices, including hard and floppy disk drives 820, CD-ROM drives 822, and other hardware capable of reading and/or storing information such as DVD, etc. In one embodiment, software for carrying out the standard and/or bonus gaming operations in accordance with the present invention may be stored and distributed on a CD-ROM 824, diskette 826 or other form of media capable of portably storing information. These storage media may be inserted into, and read by, devices such as the CD-ROM drive 822, the disk drive 820, etc. The software may also be transmitted to the computing arrangement 800 via data signals, such as being downloaded electronically via a network, such as the Internet. Further, as previously described, the software for carrying out the functions associated with the present invention may alternatively be stored in internal memory/storage of the computing arrangement 800, such as in the ROM 806. The computing arrangement 800 may be coupled to a display 814, which represents a display on which the gaming activities in accordance with the invention may be presented. The display 814 may represent the "presentation" of the video information in accordance with the invention, and may be any type of known display or presentation screen, such as LCD displays, plasma display, cathode ray tubes (CRT), etc. Where the computing arrangement 800 represents a stand-alone or networked computer, the display 820 may represent a standard computer terminal or display capable of displaying multiple windows, frames, and/or other visual outputs. A user input interface 828 such as a mouse or keyboard may be provided where the computing arrangement 800 is associated with a standard computer. An embodiment of a user input interface 828 is illustrated in connection with an electronic gaming machine 700 of FIG. 7 as the user interface 706. User input interface devices may include buttons, joysticks, keyboard, mouse, microphone, touch pad, touch screen, voice-recognition system, etc.

The computing arrangement 800 may be connected to other computing devices or gaming machines, such as via a network. The computing arrangement 800 may be connected to a network server 830 in an intranet or local network configuration. The computer may further be part of a larger network configuration as in a global area network (GAN) such as the Internet. In such a case, the computer accesses one or more web servers 832 via the Internet 834.

Other components directed to slot machine implementations include manners of gaming participant payment, and gaming machine payout. For example, a slot machine including the computing arrangement 800 may also include a hopper controller 836 to determine the amount of payout to be provided to the participant. The hopper controller may be integrally implemented with the processor 802, or alternatively as a separate hopper controller 836. A hopper 838 may also be provided in slot machine embodiments, where the hopper serves as the mechanism holding the coins/tokens of the machine. The wager input module 840 represents any mechanism for accepting coins, tokens, coupons, tickets (e.g., ticket-in-ticket-out; TITO), bills, credit cards, smart cards, membership cards, electronic funds transfers and the like for which a participant inputs a wager amount.

Figure 9A:
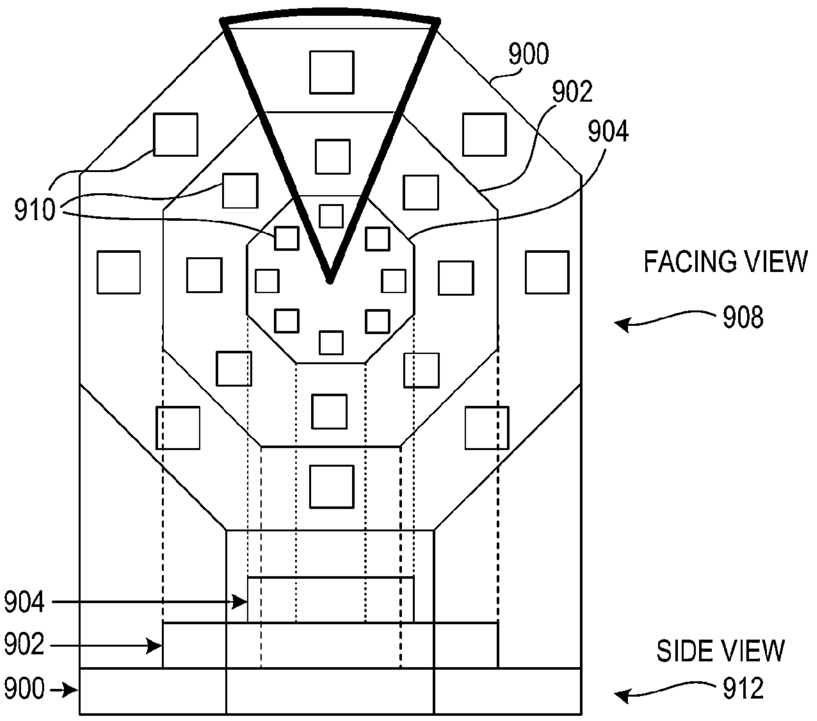
FIGS. 9A and 9B illustrate representative embodiments of the invention using non-circular shapes.

In one embodiment, shapes other than circular wheels or rings may be used. While circular shapes facilitate a concentric design such that one wheel may fit and rotate within another wheel, the present invention is applicable to non-circular shapes in various physical configurations. For example, a stacked concentric configuration may be used. More particularly, one or more of the shapes may be in the form of an octagon or other multi-side shape, and these shapes may be positioned on top of one another to appear concentric while still being able to individually spin relative to one another. Such an example is shown in FIG. 9A, where three octagons 900, 902, 904 of different sizes are stacked, with an axis 906 through the center of the face of each octagon as shown in the facing view 908. Numbers or other indicia 910 may be placed along an outer circumference of the face of each octagon such that the numbers/indicia 910 are visible when the octagons are stacked. This stacking may be seen in the side view 912. In this manner, the shapes are visibly concentric while allowing each octagon to be rotated independent of one another. This applies to any rotatable shape such as triangles, squares, or other symmetrical or non-symmetrical shapes. This would also apply to circular shapes, which could be stacked in such a manner, although circular shapes also have the ability to be purely concentric in that they mechanically fit and rotate within another circular shape rather than being stacked.

Figure 9B:
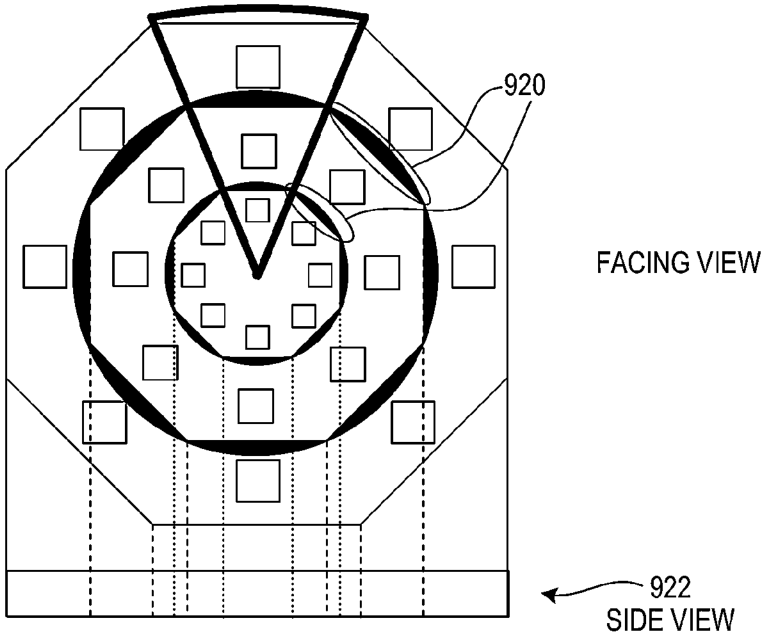

In another embodiment, non-circular shapes may be utilized without being stacked. Such an embodiment is shown in FIG. 9B, again using an octagon as an example. In this embodiment, the shapes can be fitted inside one another by providing enough space 920 between the outer diameter of an inner shape and the inside diameter of the shape to which it is being positioned. As can be seen by the side view 922, the non-circular shapes need not be stacked as was the case in the example of FIG. 9A.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. An apparatus for presenting gaming payouts comprising:

a memory storing data related to a plurality of first award indicia and a plurality of second award indicia;

a video display device including:

a first rotatable shape having a plurality of segments, where at least some of the plurality of segments include at least one of the first award indicia, a second rotatable shape having a plurality of segments, where at least some of the plurality of segments include at least one of the second award indicia, a first segment designator positioned proximate to the first rotatable shape, and a second segment designator positioned proximate to the second rotatable shape;

a wager input mechanism structured to accept currency, cards, or currency based tickets; and a processor operable to:

rotate the first rotatable shape, rotate the second rotatable shape, stop rotation of the first rotatable shape, stop rotation of the second rotatable shape, identify at least one section of the first rotatable shape with the first segment designator, identify at least one section of the second rotatable shape with the second segment designator, and determine a collective payout result based on the first award indicia associated with the identified section of the first rotatable shape and the second award indicia associated with the identified section of the second rotatable shape.

2. The apparatus of claim 1, wherein the plurality of first award indicia includes a plurality of first numerical values and the plurality of second award indicia includes a plurality of second numerical values.

3. The apparatus of claim 2, wherein the processor is operable to determine a collective payout result by summing the first numerical value associated with the identified section of the first rotatable shape with the second numerical value associated with the identified section of the second rotatable shape.

4. The apparatus of claim 2, wherein the processor is operable to determine a collective payout result by generating a multi-digit numeral constructed from a succession of the first numerical value associated with the identified section of the first rotatable shape and the second numerical value associated with the identified section of the second rotatable shape.

5. The apparatus of claim 1, wherein the plurality of first award indicia includes a plurality of numerical values and the plurality of second award indicia includes a plurality of multiplier values.

6. The apparatus of claim 5, wherein the processor is operable to determine a collective payout result by multiplying the numerical value associated with the identified section of the first rotatable shape with the multiplier value associated with the identified section of the second rotatable shape.

7. The apparatus of claim 1, wherein the plurality of first award indicia includes a plurality of first multiplier values and the plurality of second award indicia includes a plurality of second multiplier values.

8. The apparatus of claim 7, wherein the processor is operable to determine a collective payout result by multiplying the first multiplier value associated with the identified section of the first rotatable shape with the second multiplier value associated with the identified section of the second rotatable shape.

9. The apparatus of claim 1, wherein the plurality of first award indicia includes at least one termination indicator.

10. The apparatus of claim 1, wherein the video display device includes a primary gaming activity presentation and a bonus activity presentation, where the first rotatable shape and the second rotatable shape are included in the bonus activity presentation.

11. The apparatus of claim 10, wherein the primary gaming activity presentation includes multiple slot gaming reels.

12. The apparatus of claim 10, wherein the primary gaming activity presentation includes a video poker presentation.

13. The apparatus of claim 1, wherein the first rotatable shape and the second rotatable shape are rotatable about a common axis through the face of each of the first rotatable shape and the second rotatable shape.

14. The apparatus of claim 13, wherein the first segment designator is substantially aligned with the second segment designator.

15. The apparatus of claim 14, wherein the first segment designator identifies a segment of the first rotatable shape by framing the identified segment of the first rotatable shape, and wherein the second segment designator identifies a segment of the second rotatable shape by framing the identified segment of the second rotatable shape.

16. An apparatus for presenting gaming payouts comprising:

a memory storing data related to a plurality of first award indicia and a plurality of second award indicia, wherein at least one of the plurality of first award indicia is a first terminator indicator and at least one of the plurality of second award indicia is a second terminator indicator;

a video display device including:

a first rotatable shape having a plurality of segments, where at least some of the plurality of segments include at least one of the first award indicia, a second rotatable shape having a plurality of segments, where at least some of the plurality of segments include at least one of the second award indicia, a first segment designator positioned proximate to the first rotatable shape, and a second segment designator positioned proximate to the second rotatable shape;

a wager input mechanism structured to accept currency, cards, or currency based tickets; and a processor operable to:

initiate a bonus activity in response to a bonus indicator received during a primary game activity, initiate a first bonus spin by rotating the first rotatable shape, rotating the second rotatable shape, stopping rotation of the first rotatable shape, stopping rotation of the second rotatable shape, identifying at least one section of the first rotatable shape with the first segment designator, and identifying at least one section of the second rotatable shape with the second segment designator, determine a first collective payout result based on the first award indicia associated with the identified section of the first rotatable shape and the second award indicia associated with the identified section of the second rotatable shape for the first bonus spin, initiate a second bonus spin when the first terminator indicator and the second terminator indicator are not received in the identified section of the first rotatable shape and the identified section of the second rotatable shape, respectively for the first bonus spin, the second bonus spin initiated by rotating the first rotatable shape, rotating the second rotatable shape, stopping rotation of the first rotatable shape, stopping rotation of the second rotatable shape, identifying at least one section of the first rotatable shape with the first segment designator, and identifying at least one section of the second rotatable shape with the second segment designator determine a second collective payout result based on the first award indicia associated with the identified section of the first rotatable shape and the second award indicia associated with the identified section of the second rotatable shape for the second bonus spin, and determine an accumulated collective payout, wherein the accumulated collective payout includes the first collective payout when the first terminator indicator and the second terminator indicator are received in the identified section of the first rotatable shape and the identified section of the second rotatable shape, respectively for the first bonus spin, and wherein the accumulated collective payout includes both the first collective payout and the second collective payout when the first terminator indicator and the second terminator indicator are not received in the identified section of the first rotatable shape and the identified section of the second rotatable shape, respectively for the first bonus spin.

17. An apparatus for presenting gaming payouts comprising:

a memory storing data related to a plurality of first award indicia and a plurality of second award indicia;

a display including:

a first wheel having a plurality of segments each including at least one of the first award indicia, a second wheel having a plurality of segments each including at least one of the second award indicia, and a segment designator positioned proximate to the first wheel and the second wheel;

a wager input mechanism structured to accept currency, cards, or currency based tickets; and a processor operable to:

spin the first wheel on the display, spin the second wheel on the display, identify at least one section of the first wheel with the segment designator by stopping the first wheel on the display, identify at least one section of the second wheel with the segment designator by stopping the second wheel on the display, and determine a collective payout result based on the first award indicia associated with the identified section of the first wheel and the second award indicia associated with the identified section of the second wheel.

18. The apparatus of claim 17, wherein the processor is operable to identify at least one section of the first wheel with the segment designator by highlighting the identified section of the first wheel on the display, and wherein the processor is operable to identify at least one section of the second wheel with the segment designator by highlighting the identified section of the second wheel on the display.

19. The apparatus of claim 17, wherein the first wheel and the second wheel are concentric.

20. The apparatus of claim 17, further comprising a user interface, wherein the processor is operable to spin the first wheel and the second wheel in response to signals received from the user interface.

* * * * *